United States Patent [19]

Stanesic et al.

[11] Patent Number: 5,249,836
[45] Date of Patent: Oct. 5, 1993

[54] REAR AIR DEFLECTOR FOR MOTOR VEHICLES

[75] Inventors: John M. Stanesic, Johnston; Michael G. Harrison, Urbandale, both of Iowa

[73] Assignee: DFM Corporation, Urbandale, Iowa

[21] Appl. No.: 912,325

[22] Filed: Jul. 13, 1992

Related U.S. Application Data

[63] Continuation-in-part of Ser. No. 744,230, Aug. 13, 1991.

[51] Int. Cl.⁵ .............................................. B60J 1/20
[52] U.S. Cl. .................................. 296/180.1; 296/91; D12/181
[58] Field of Search .............. 296/91, 180.1, 180.4; D12/181

[56] References Cited

U.S. PATENT DOCUMENTS

| | | | |
|---|---|---|---|
| D. 204,932 | 5/1966 | Bott | D14/6 |
| D. 206,872 | 2/1967 | Borick | D14/6 |
| D. 212,531 | 10/1968 | Stephen | D14/6 |
| D. 291,978 | 9/1987 | Parr | D12/181 |
| 2,933,344 | 4/1960 | Shumaker | 296/91 |
| 3,072,431 | 1/1963 | Shumaker | 296/1 |
| 3,090,645 | 5/1963 | Shumaker | 296/91 |
| 3,097,882 | 7/1963 | Andrews | 296/91 |
| 3,427,067 | 2/1969 | Kish | 296/1 |
| 3,596,975 | 8/1971 | Stephen | 296/91 |
| 3,785,699 | 1/1974 | Molaskey | 296/152 |
| 3,799,603 | 3/1974 | Bott | 296/91 |
| 3,856,193 | 12/1974 | Bott | 224/42.1 D |
| 3,930,432 | 1/1976 | Puchy | 85/53 |
| 4,842,319 | 6/1989 | Ziegler et al. | 296/91 |

FOREIGN PATENT DOCUMENTS

| | | |
|---|---|---|
| 58350 | 7/1987 | Canada . |
| 1289167 | 9/1991 | Canada . |

OTHER PUBLICATIONS

Streamline Deflectors 136 Brandt Rd. Box 2369, Steinbach, MB R0A 2A0.
Deflecta-Shield 1989½ Catalog.

*Primary Examiner*—Robert R. Song
*Attorney, Agent, or Firm*—Zarley, McKee, Thomte, Voorhees & Sease

[57] ABSTRACT

A rear air deflector includes a shield which is mounted directly to a vehicle using expandable insert style fasteners. The shield is spaced apart from the window frame, except at the ends of the shield which engage the frame. The shield is concave substantially along its length, though the ends are flattened for mating engagement with the window frame. The opposite end portions of the shield have a reverse-curve profile such that the ends are parallel to the window frame surface for mating engagement with the surface. The direct mounting of the deflector to the vehicle eliminates the need for mounting brackets.

23 Claims, 2 Drawing Sheets

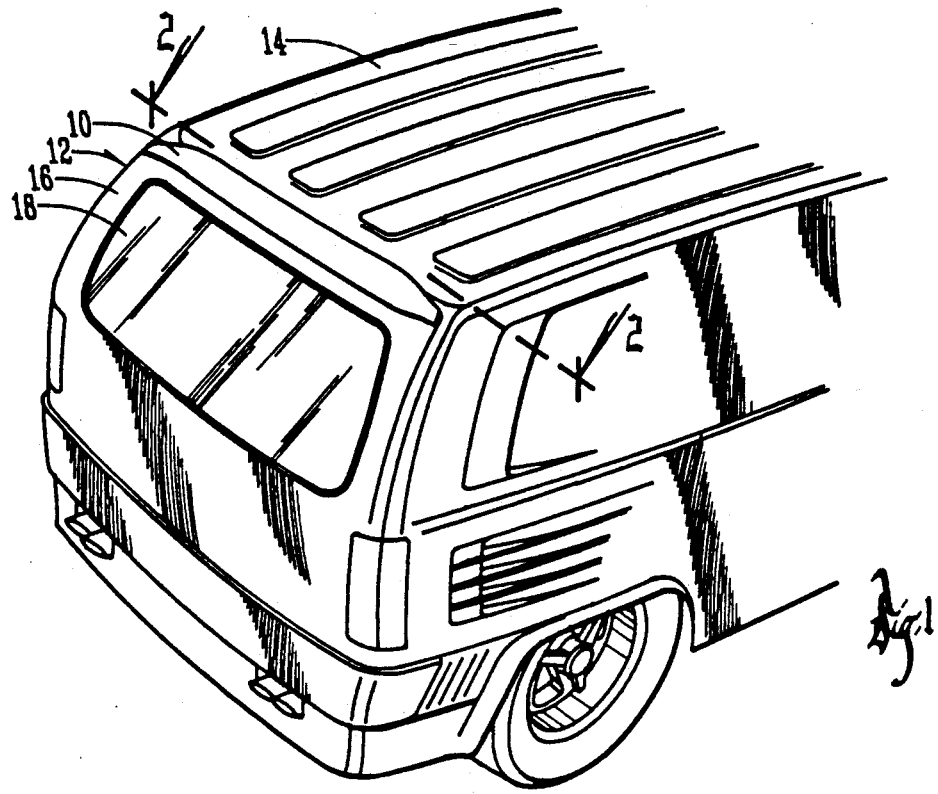
Fig. 1
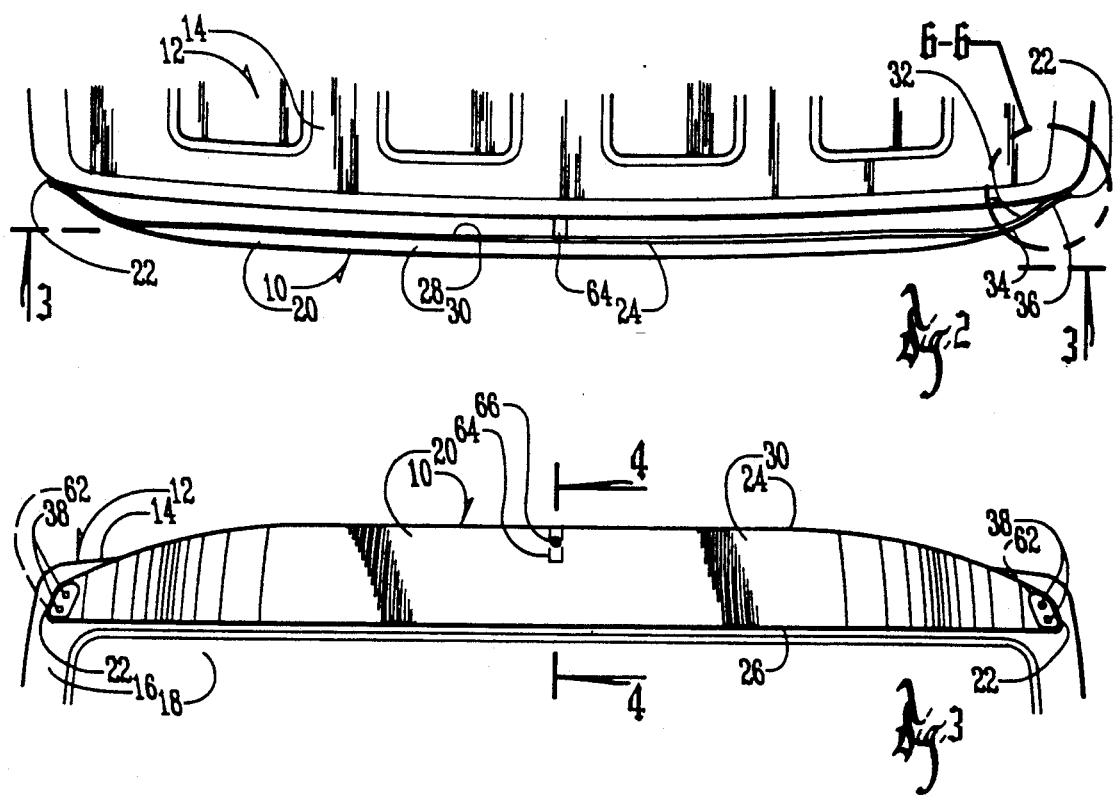
Fig. 2
Fig. 3

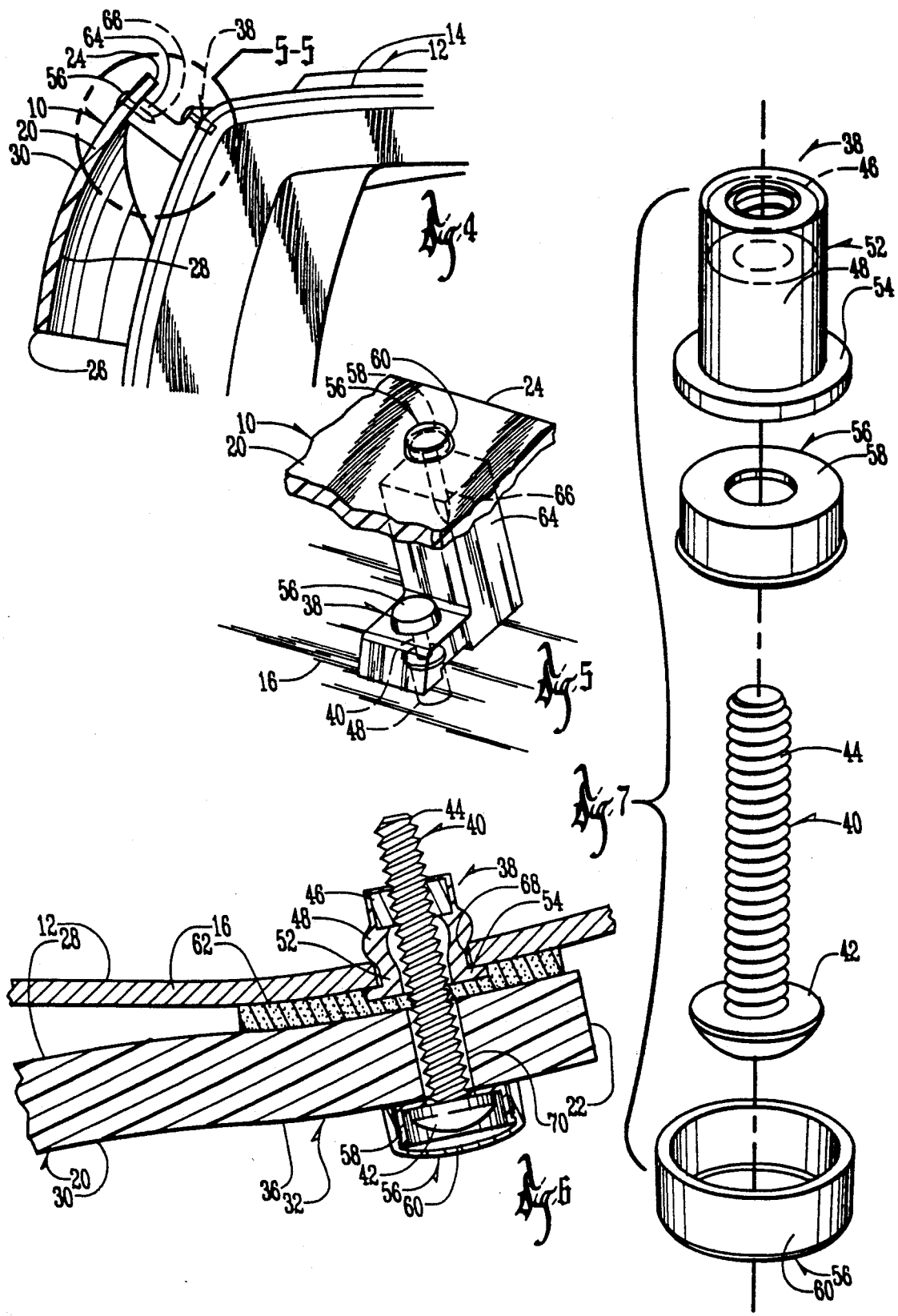

REAR AIR DEFLECTOR FOR MOTOR VEHICLES

This is a continuation-in-part of co-pending application Ser. No. 07/744,230 filed Aug. 13, 1991. pending

BACKGROUND OF THE INVENTION

Rear air deflectors have been used for many years on motor vehicles such as station wagons, vans and trucks having a substantially vertical rear window to prevent dust from accumulating on the window. Conventional rear air deflectors are mounted above the rear window using mounting brackets such that the upper edge of the deflector resides above the roof line of the vehicle. Air is deflected by the deflector downwardly over the rear window when the vehicle is moving forwardly so as to keep the window free from dust and the like. The use of the mounting brackets adds to the cost of the deflector, and to the complexity and time for mounting the deflector on the vehicle.

A primary objective of the present invention is the provision of an improved rear air deflector for motor vehicles which is directly mounted to the vehicle without the use of mounting brackets.

Another objective of the present invention is the provision of a rear air deflector having end portions which are curved so as to matingly engage the rear window frame of the vehicle.

Still another objective of the present invention is the provision of a rear air deflector which is aesthetically pleasing in appearance.

Another objective of the present invention is the provision of a rear air deflector which is economical to manufacture, and durable and effective in use.

These and other objectives will be become apparent from the following description of the invention.

SUMMARY OF THE INVENTION

The rear air deflector of the present invention comprises an elongated shield having opposite ends, opposite upper and lower edges, and opposite forward and rearward surfaces. The end portions of the shield have a reverse-curve profile. The shield is spaced apart from the rear window frame of the vehicle substantially along its length, but the end portions are curved so as to be substantially parallel with the window frame. Accordingly, the end portions of the shield matingly engage the window frame. The end portions of the shield are secured directly to the frame using an expandable insert style fastener. A protective pad is positioned between the shield member and the window frame so as to seal out moisture and to prevent scratching of the frame.

BRIEF DESCRIPTION OF THE DRAWINGS

FIG. 1 is a perspective view of the rear end of a van or mini-van having the rear air deflector of the present invention mounted thereon.

FIG. 2 is a top plan view taken along lines 2—2 of FIG. 1.

FIG. 3 is an end view taken along lines 3—3 of FIG. 2.

FIG. 4 is a sectional view taken along lines 4—4 of FIG. 3.

FIG. 5 is an enlarged perspective view taken along lines 5—5 of FIG. 4.

FIG. 6 is an enlarged sectional view taken along lines 6—6 of FIG. 2.

FIG. 7 is an exploded perspective view of the nut and bolt assembly used to mount the shield to the vehicle.

DETAILED DESCRIPTION OF THE DRAWINGS

The rear air deflector of the present invention is generally designated by the reference numeral 10 in the drawings. Deflector 10 is designed for use on a vehicle 12, such as a van, mini-van, truck, station wagon or sport utility vehicle having a substantially square rearward end defined by a roof 14 and a window frame 16 surrounding a substantially vertical rear window 18.

Deflector 10 comprises an elongated shield 20 having opposite terminal ends 22, opposite upper and lower edges 24, 26 respectively, and opposite forward and rearward surfaces 28, 30 respectively. As best seen in FIG. 4, the shield is concave between the top and bottom edges 24, 26 substantially along the length of the shield. The end portions 32 of the shield adjacent the terminal ends 22 have a reverse-curve profile, including an inner concave section 34 curving forwardly from the main body of the shield and an outer convex or flattened section 36 extending to the terminal ends 22, as seen in FIGS. 2 and 6. This reverse-curve profile allows the outer section 36 to be substantially parallel with the window frame 16 so that the shield 20 matingly engages the frame 16 adjacent the opposite end portions 32. The terminal ends 22 of the shield 20 are substantially perpendicular to the surface of window frame 16, as seen in FIG. 6. The concavity of shield 20 between its top and bottom edges is eliminated at outer sections 36 so that the outer section presents a substantially flattened surface for engaging the frame 16.

Shield 20 is mounted directly to window frame 16 using a plurality of fasteners 38. Each fastener 38 is an expandable insert style assembly which functions similar to a pop rivet. More particularly, each fastener 38 includes a bolt 40 having a head 42 and a shaft 44, and a nut 46, as best seen in FIG. 7. Nut 46 is molded into a deformable outer bushing 48 made of rubber or the like, as seen in FIG. 6. Rubber member 48 includes a body 52 and an outer flange 54. Fasteners 38 are commercially available from Pop Fasteners of Shelton, Conn. under the trademark "WELLNUT."

A cover means 56 is provided for enclosing head 42 of bolt 40. Cover means 52 includes a collar member 58 mounted upon shaft 44 and a cap member 60 adapted to snap fit on to collar member 54 so as to enclose head 42 of bolt 40, as seen in FIG. 6. Cover means 52 is described in U.S. Pat. No. 3,930,432, which is incorporated herein by reference, and is commercially available from Pro-dec Products, Inc. in Stafford, Tex. under the trademark "SNAP-CAPS".

Shield 20 is mounted directly to window frame 16 of vehicle 12 using a pair of fasteners 38 at each end portion 32 of the shield, such that the top edge 24 of the shield resides above the roof 14 of the vehicle 12. A resilient pad 62 is positioned between shield 20 and frame 16, as shown in FIG. 6, so as to protect the painted frame from scratches. Pad 62 is made of closed cell foam material so as to seal out moisture between each end portion 32 of the shield and frame 16. Preferably, pad 62 is secured to shield 20 by adhesive. A center support stanchion 64, shown in FIGS. 4 and 5, extends between shield 20 and frame 16 approximately midway between the opposite ends 22 of the shield, so as to provide structural support between the shield and the vehicle. Support stanchion 64 is secured to the window frame 16 using a fastener 38 and secured to the shield 20 by a conventional screw 66. A cover means 52 covers the head of screw 66.

To mount shield 20 to window frame 16, deformable member 48 of fastener 38 is inserted into a hole 68 drilled in window frame 16 of vehicle 12 so that flange 54 engages the outer surface of the frame. Collar member 58 of the cover means 56 is placed on bolt 40, and the bolt is inserted through a hole 70 in the shield for threadable receipt by threaded member 50 of fastener 38. As bolt 40 is tightened, the body 52 of member 48 is expanded or deformed, as seen in FIG. 6, so as to securely mount shield 20 to the window frame 16 of vehicle 12. Body 52 of member 48 also prevents moisture from entering hole 68 in the vehicle window frame. Cap member 60 is then snap fit on to collar member 58 so as to cover head 42 of bolt 40. If it is necessary or desirable to remove the shield 20 from vehicle 12, cap member 60 is removed and bolt 40 unthreaded from threaded member 50, such that the shield can be lifted from the vehicle.

From the foregoing, it can be seen that rear air deflector 10 is directly mounted to the vehicle 12 without the use of mounting brackets. Thus, the deflector can be more economically manufactured and sold, and more easily and quickly mounted to the vehicle. Accordingly, at least all of the stated objectives are satisfied by the deflector of the present invention.

What is claimed is:

1. A rear air deflector for vehicles such as automobiles, vans, and trucks having a roof, a rear window, and a window frame extending around the window, the deflector comprising:

an elongated shield having opposite terminal ends, opposite upper and lower edges, and opposite forward and rearward surfaces;

the shield having a reverse curve profile adjacent each end such that the forward surface of the shield adjacent each end is substantially parallel to the window frame so as to provide mating engagement between the forward surface of shield adjacent the shield ends and the window frame; and fastening means extending through the shield and into the window frame for securing the ends of the shield directly to the vehicle without use of mounting brackets on the ends of the shield.

2. The rear air deflector of claim 1 wherein the shield has substantially flat end portions adjacent each end for mating engagement with the window frame.

3. The rear air deflector of claim 1 wherein each terminal end of the shield defines a plane substantially perpendicular to the window frame.

4. The rear air deflector of claim 1 further comprising a protective pad between the shield and window frame.

5. The rear air deflector of claim 1 further comprising a support stanchion connected to and extending between the shield and the window frame approximately midway between the ends of the shield.

6. The rear air deflector of claim 1 wherein the upper edge of the shield resides above the roof of the vehicle substantially along the length of the shield.

7. The rear air deflector of claim 1 wherein the fastening means is an expandable insert style assembly.

8. The rear air deflector of claim 1 wherein the fastening means includes a bolt and a nut, the nut having threaded inner member for threadably receiving the bolt, and a deformable outer portion adapted to extend through a hole in the window frame and to deform into retentive engagement with the window frame when the bolt is tightened in the nut.

9. The rear air deflector of claim 8 wherein the outer portion of the nut includes a flange to prevent the nut from passing through the hole in the window frame.

10. The rear air deflector of claim 8 wherein the bolt has a shaft extending through the shield and a head residing adjacent the rearward surface of the shield, and the fastener means further includes cover means for covering the head of the bolt.

11. The rear air deflector of claim 10 wherein the cover means includes a collar member received on the shaft of the bolt and a cap member removably snap fit onto the collar member such that the bolt head is contained between the collar member and cap member.

12. A rear air deflector for deflecting air downwardly over a rear window of a motor vehicle, the vehicle having a window frame surrounding the window, the deflector comprising:

a shield member mounted directly on the window frame and having an upper portion extending above the roof of the vehicle to deflect air downwardly over the rear window as the vehicle moves forwardly;

the shield member having opposite outer end sections which are parallel to and in mating engagement with the window frame; and fastening means for connecting the shield member to the window frame.

13. The rear air deflector of claim 12 wherein the end sections of the shield member are substantially flat and the shield member has an elongated concave central portion between the end portions.

14. The rear air deflector of claim 12 wherein the shield member is elongated and spaced from the window frame substantially along is length.

15. The rear air deflector of claim 14 wherein the shield member has forwardly curved sections terminating in the end sections.

16. The rear air deflector of claim 12 wherein the end portions include padding means to protect the window frame from scratches by the shield member and to seal out moisture between the end portions and the frame.

17. The rear air deflector of claim 14 further comprising support means interconnecting the shield member and the window frame approximately midway between the end portions of the shield member.

18. The rear air deflector of claim 12 wherein the fastening means is an expandable insert style assembly.

19. The rear air deflector of claim 18 wherein the fastening means includes a bolt extending through the end portion of the shield member and through the window frame, and a deformable nut partially extending through the window frame to secure the shield member to the window frame when the bolt is tightened.

20. The rear air deflector of claim 19 wherein the fastening means includes cap means covering the bolt.

21. A method of mounting an air deflector to a motor vehicle, the vehicle having a rear window and a window frame extending around the window, the deflector having opposite ends, the method comprising:

positioning the deflector above the rear window with the ends of the deflector engaging the window frame adjacent opposite sides of the window;

securing the ends of the deflector to the window frame without the use of mounting brackets at the ends of the deflector.

22. The method of claim 21 further comprising providing a protective pad between the ends of the deflector and the window frame.

23. The method of claim 21 further comprising connecting a support stanchion between the deflector and the window frame at a location between the ends of the deflector.

* * * * *